US005487273A

United States Patent [19]

Elpern et al.

[11] Patent Number: 5,487,273

[45] Date of Patent: Jan. 30, 1996

[54] TURBOCHARGER HAVING PNEUMATIC ACTUATOR WITH PILOT VALVE

[75] Inventors: David G. Elpern, Los Angeles; James E. T. Blake, Rancho Palos Verdes, both of Calif.

[73] Assignee: AlliedSignal Inc., Morristown, N.J.

[21] Appl. No.: 120,610

[22] Filed: Sep. 13, 1993

[51] Int. Cl.[6] .......... F02D 23/00; F16K 31/126

[52] U.S. Cl. .......... 60/602; 137/489.5

[58] Field of Search .......... 60/602; 137/489.5, 137/492.5, 540; 251/39

[56] References Cited

U.S. PATENT DOCUMENTS

| | | | |
|---|---|---|---|
| 2,420,370 | 5/1947 | Hamilton | 137/492.5 |
| 3,102,382 | 4/1981 | Bozzola . | |
| 3,270,951 | 9/1966 | Reed . | |
| 3,362,424 | 1/1968 | Smith et al. . | |
| 4,073,466 | 2/1978 | Snyder . | |
| 4,074,688 | 2/1978 | Snyder . | |
| 4,242,082 | 12/1980 | Branson et al. . | |
| 4,242,083 | 12/1980 | Demi . | |
| 4,286,433 | 9/1981 | Detweiler | 60/602 |
| 4,309,022 | 1/1982 | Reinicke et al. . | |
| 4,311,008 | 1/1982 | Yamada . | |
| 4,531,548 | 7/1985 | Gottling et al. . | |
| 4,606,340 | 8/1986 | Ansite . | |
| 4,712,577 | 12/1987 | Angelillo . | |
| 4,789,131 | 12/1988 | Vork . | |
| 4,840,347 | 6/1989 | Ariizuimi et al. . | |

FOREIGN PATENT DOCUMENTS

| | | | |
|---|---|---|---|
| 2467289 | 4/1981 | France . | |
| 58-152125 | 9/1983 | Japan | 60/602 |
| 59-153920 | 9/1984 | Japan | 60/602 |
| 63-32125 | 2/1988 | Japan | 60/602 |
| 2068455 | 8/1981 | United Kingdom . | |

*Primary Examiner*—Michael Koczo
*Attorney, Agent, or Firm*—John R. Rafter

[57] ABSTRACT

A pneumatic actuator for controlling the wastegate valve of an exhaust gas driven turbocharger includes a pilot piston which is responsive to boost pressure to open only when a desired boost pressure is attained. Accordingly, premature opening of the wastegate valve is avoided because the main actuator piston is maintained at atmospheric pressure until the desired actuating pressure is attained.

20 Claims, 4 Drawing Sheets

TURBOCHARGER HAVING PNEUMATIC ACTUATOR WITH PILOT VALVE

This invention relates to an exhaust driven turbocharger having increased boost pressure at low engine speeds. An exhaust gas driven turbocharger supplies charge air to an engine by using engine exhaust gases to rotate a turbine wheel mounted on a shaft thereby rotating a compressor wheel mounted on the other end of the same shaft. The compressor wheel compresses air and delivers boost air to the intake manifold of the engine, thereby increasing engine power. If the pressure level of the boost air is too high, the engine may be over boosted and damaged; accordingly, it has become customary to control the turbocharger usually by providing a wastegate valve which opens a bypass passage around the turbine wheel when the pressure level of the boost air increases to a predetermined level. The wastegate valve is normally actuated by a pneumatic actuator which is operated by the boost air pressure level delivered by the compressor wheel.

It is generally desirable to increase the boost pressure level as quickly as possible at low engine speeds to increase engine performance. However, in prior art turbochargers, boost pressure level at low engine speeds is lost due to premature opening of the wastegate valve. This is a result of the pneumatic actuator controlling the wastegate valve being subjected to gradually increasing boost pressure, thereby gradually opening the wastegate valve before the desired pressure level at which the wastegate valve is designed to open, and because the pressure of exhaust gases against the wastegate valve in the turbine section of the turbocharger also tends to force the wastegate valve open. The latter factor is increased due to the fact that the pressure level of the exhaust gases pulsates during normal engine operation. Due to the decreased availability of boost air, engine performance at low engine speeds is degraded.

The present invention solves the aforementioned problem by providing a pilot valve which prevents communication of boost air into the pneumatic actuator until the predetermined pressure level of the boost air is attained at which the wastegate valve should open. Accordingly, the boost air is prevented from operating the pneumatic actuator during low engine speed operation so that substantially atmospheric pressure is maintained in the actuator until the boost pressure attains the predetermined level at which the wastegate valve is to open. At this pressure level, the pilot valve opens, admitting boost air into the actuator, where it acts against the conventional actuating piston to operate the wastegate actuating linkage. Since the wastegate valve is maintained closed until the predetermined pressure level is attained, substantially increased engine performance is available at low engine speeds.

These and other advantages of the present invention will become apparent from the following specification, with reference to the accompanying drawings, in which.

Figure 1:
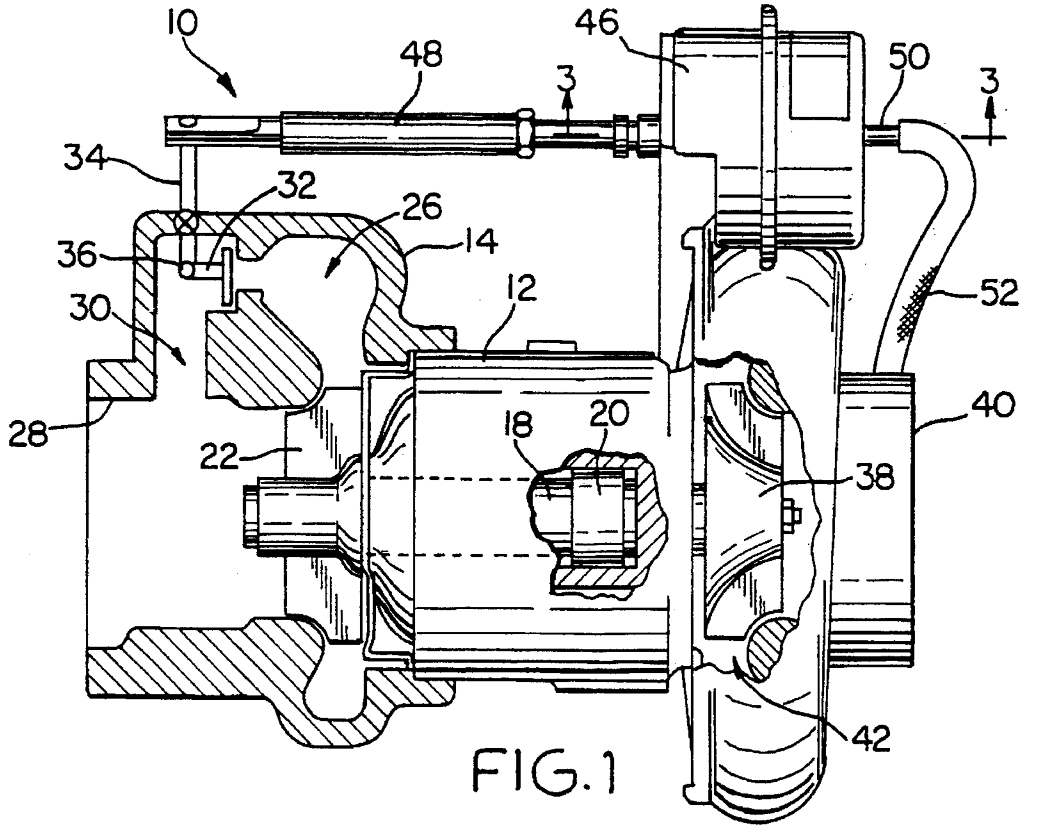
FIG. 1 is a side view, partly in section, of a turbocharger made pursuant to the teachings of the present invention.

Referring now to the drawings, a turbocharger generally indicated by the numeral 10 includes a center housing 12, a turbine housing 14 mounted on one end of the center housing 12, and a compressor housing 16 mounted on the opposite end of the housing 12. A shaft 18 is rotatably mounted within the center housing 12 by a pair of axially spaced bearings, one of which being illustrated at 20. One end of the shaft 18 extends into the turbine housing 14 and supports a conventional turbine wheel 22 within the turbine housing 14. Turbine housing 14 further includes an inlet (not shown) which communicates exhaust gases into a circumferentially extending volute 26, which circumscribes the turbine wheel 22, and directs the high energy exhaust gases into the turbine wheel 22. After passing through the turbine wheel 22, the exhaust gases are discharged into the engine exhaust system through outlet 28. A bypass passage 30 bypasses around the turbine wheel 22 by connecting the volute 26 directly to the outlet 28. A wastegate valve 32 includes a lever actuator 34 which is pivotally mounted on the turbine housing 14 as at 36. Accordingly, as can be seen in FIG. 1, the waste gate valve can be moved between positions opening and closing communication through the bypass passage 30. The turbine wheel 22 is fixed on the shaft 18 so that rotation of the turbine wheel by exhaust gases communicated through the volute 26 also effect rotation of the shaft 18.

A compressor wheel 38 is mounted on the opposite end of the shaft 18 which extends into the compressor housing 16. Air is drawn through an inlet 40 by rotation of the compressor wheel 38 and is discharged into outlet volute 42, which communicates with an outlet (not shown) connected to the engine induction manifold (not shown). The compressor wheel 38 is of conventional design, and is fixed to the shaft 18 so that rotation of the shaft 18 by the turbine wheel 22 also rotates the compressor wheel 38. Accordingly, rotation of the compressor wheel 38 compresses the air drawn through the inlet 40 and thereby delivers boost air to the outlet.

A pressure operated actuator herein indicated by the numeral 46 is mounted on the compressor housing 16 and includes an output linkage 48 which is connected to the lever 34 for operating the waste gate valve 32. Boost air discharged into the outlet volute 42 is communicated to an inlet projection 50 of the actuator 46 through a hose 52. The actuator 46 comprises a housing generally indicated by the numeral 54 consisting of a circumferentially extending wall 56 and a pair of transverse end walls 58, 60. The housing 54 is formed in two halves which are crimped together by a circumferentially extending crimp 62. The inlet projection 50 is mounted in the end wall 58, and linkage 48 extends through the end wall 60. An actuator spring 64 urges a stamped metal actuator piston 66 upwardly viewing FIG. 3. The piston 66 includes a circumferentially extending outer skirt 68, an inner skirt 70 which cooperates with the outer skirt 68 to define a cavity receiving one end of the actuator spring 64, and a transversely extending portion 72. The transversely extending portion 72 is fastened to the actuating linkage 48 through a fastener 74.

The piston 66 further includes three circumferentially spaced, radially inwardly projecting portions 76 which guide a pilot piston 78 which is slidably received within the recess 80 defined by the transversely extending portion 72 and the inner skirt 70 of the actuator piston 66. Pilot piston 78 includes a transversely extending portion 81 and an axially projecting, circumferentially extending skirt 82 extending therefrom. The skirt 82 is the portion of the pilot piston 78 that is guided by the projections 76. Transversely extending portion 72 of actuator piston 66 further includes a circumferentially extending surface 84 which is engaged by the lower end of the skirt 82 to limit relative movement of the pilot piston 78 with respect to the actuator piston 66. The pilot piston 78 is urged upwardly, viewing the Figures by pilot spring 85 extending between the transversely extending portions 72 of the actuator piston 66 and the transversely extending portion 80 of pilot piston 78. A flexible diaphragm generally indicated by the numeral 86 includes a peripheral portion 88 that is crimped to the wall 56 within the crimp 62 and extends over a transversely extending portion 90 of actuator piston 66 interconnecting the skirts 68 and 70 and further extends over the transversely extending portion 81 of pilot piston 78. The diaphragm 86 is provided with an integral plug 91 which is received in an aperture in the transversely extending portion 81 of the pilot piston 78 coaxially with the skirt 82 to locate the diaphragm with respect to the piston 66 and 78 and to prevent the diaphragm from slipping relative to the pilot piston 78. The pilot piston spring 85 urges the pilot piston 78 into sealing engagement with a valve seat 94 defined on an inwardly projecting lip 96 formed on the end wall 58. Seat 94 circumscribes the inlet opening projection 50. A bleed hole 95 in end wall 58 vents residual pressure out of the housing 54 after pilot piston 78 seals against valve seat 94. Bleed hole 95 is large enough to vent the residual pressure in a reasonable time commensurate with maintaining sufficient pressure in the housing 54 to activate the piston 66 after pilot piston 78 moves away from seat 94.

Figure 2:
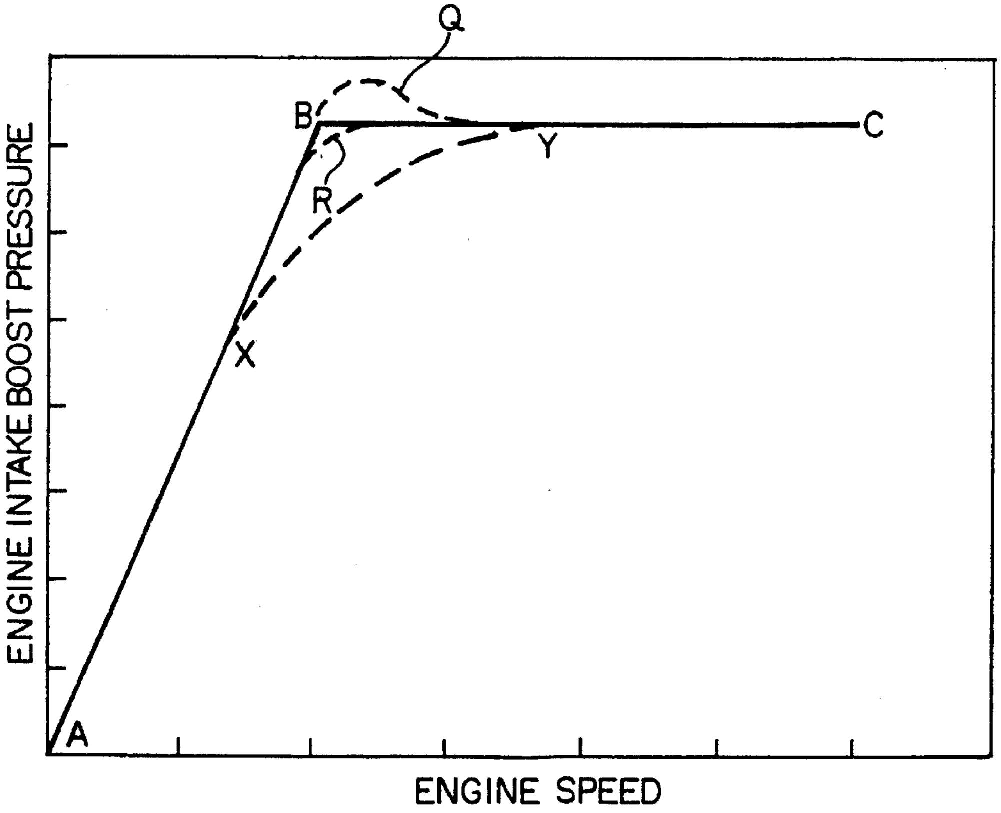
FIG. 2 is a graphical representation of the performance of the turbocharger illustrated in FIG. 1 compared with the performance of a similar prior art turbocharger.

Referring to FIG. 2, which is a curve representing the relationship between engine intake boost pressure and engine speed, the desired relationship between engine speed and boost pressure is indicated by the solid line ABC in FIG. 2. Accordingly, as indicated, it is desirable for boost pressure to increase with engine speed along line AB until the point B is reached, indicating the maximum permitted boost to the engine. At point B, it is desirable that the wastegate valve open to limit boost according to the line BC for any further increase in engine speed. Prior art wastegated turbochargers followed the dashed curve XY because, as discussed above, the wastegate valve tended to open prematurely at speeds above the engine speed represented by point X in FIG. 2. Accordingly, substantial engine boost was lost in the critical engine speed ranges in which boost is most desirable. As will be seen, the pilot piston according to the present invention prevents boost air from entering the actuator 46 until the pressure attains the predetermined pressure indicated at point B. Accordingly, a turbocharger made according to the teaching of the present invention substantially follows the curve ABC, although the device, depending upon the preload calibration of the pilot spring 85, may overshoot the desired pressure, as indicated by curve Q, or may slightly undershoot the desired pressure, as indicated by the curve R.

Figure 3:
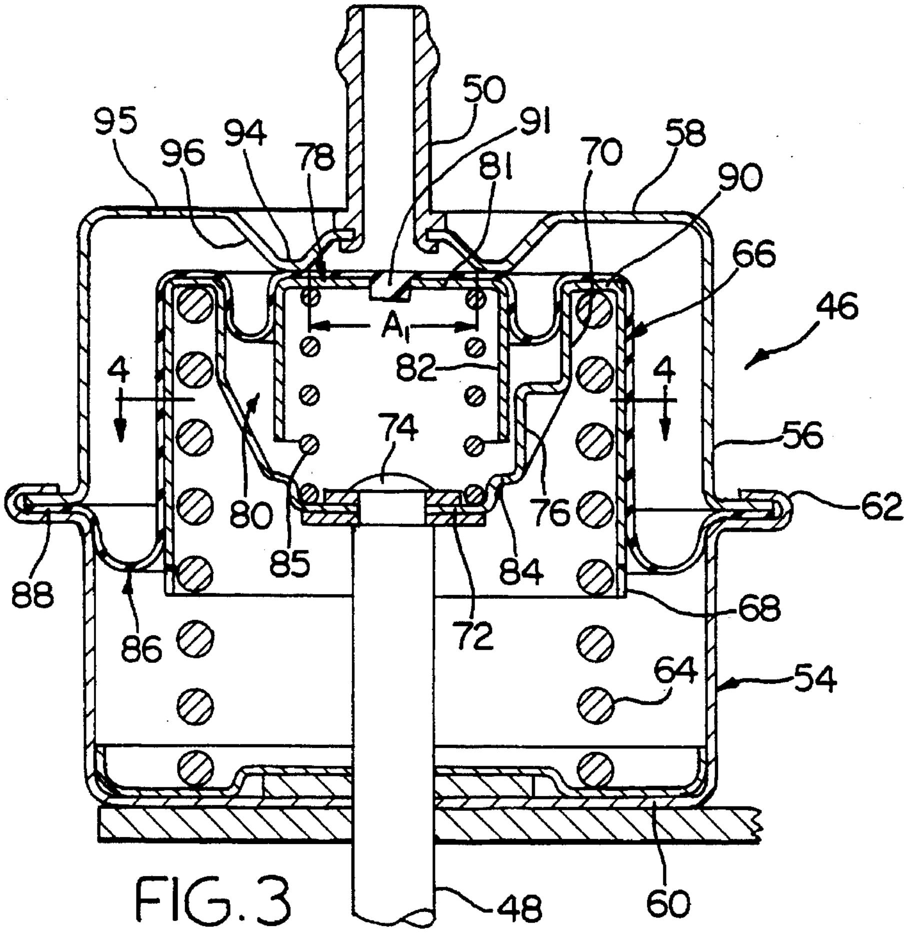
FIG. 3 is a view taken substantially along lines 3—3 of FIG. 1, illustrating the components of the pneumatic actuator in positions which they assume before the boost pressure level attains the predetermined level at which the wastegate valve is to open.
Figure 4:
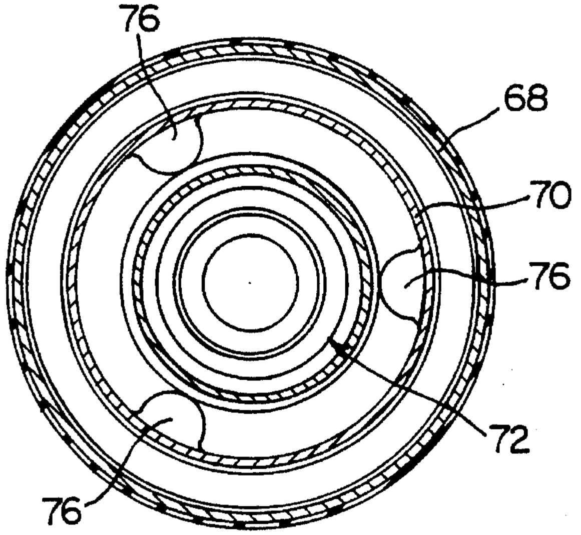
FIG. 4 is a cross-sectional view taken substantially along lines 4—4 of FIG. 3.

Referring to FIG. 3, the various components of the actuator 46 are illustrated in the positions which they assume when the boost pressure being delivered to the engine is below the desired pressure to open the wastegate valve, indicated by point B in FIG. 2. In this condition, the spring 85 yieldably urges the pilot piston 78 into sealing engagement with the valve seat 94. Accordingly, the spring 64 maintains the actuator piston 66 in the upward position illustrated in the drawings, so that the wastegate linkage 48 maintains the wastegate valve in the closed position. It will be noted that the effective area of the pilot piston 78 is indicated by the area $A_1$ in FIG. 3.

Figure 5:
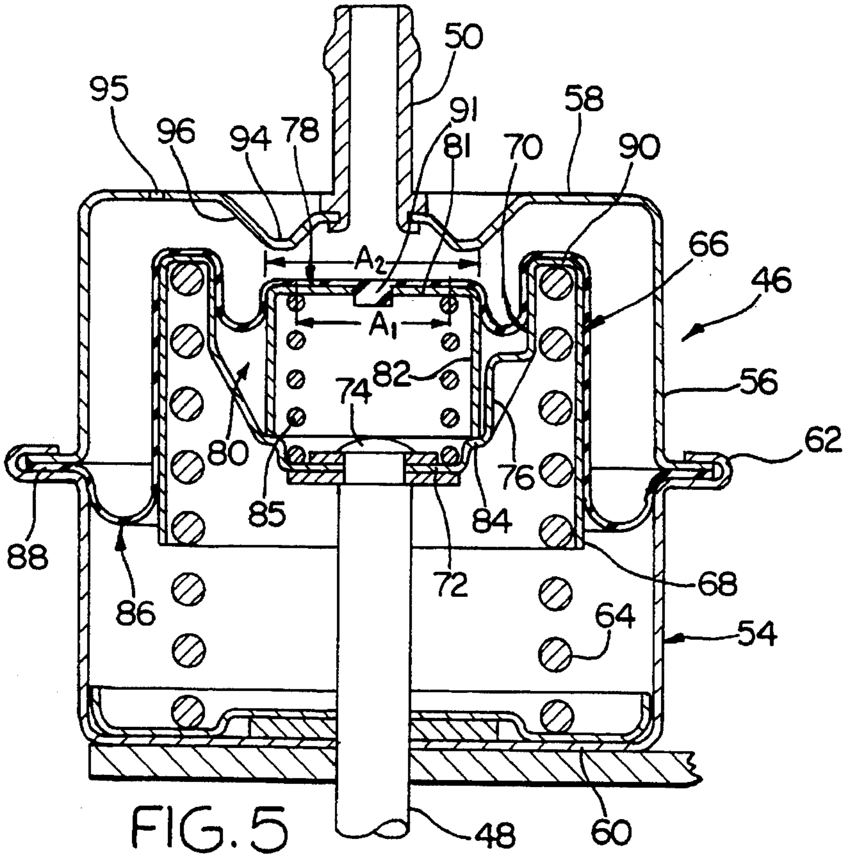
FIGS. 5 and 6 are views similar to FIG. 3 but illustrating the positions of the components of the pneumatic actuators in the position which they assume during actuation of the wastegate valve.

Referring now to FIG. 5, the various components of the actuator 46 are illustrated in the positions which they assume just as point B in FIG. 2 is attained which represents the desired maximum permitted boost pressure. In this condition, the boost pressure communicated through the inlet projection 50 and acting across the area $A_1$ is sufficient to overcome the pilot spring 85, causing the latter to yield, and driving the pilot piston 78 downwardly, viewing the Figures, until the end of skirt 82 engages the surface 84. It will be noted that, after the pilot piston moves away from the valve seat 94, the effective area of the piston becomes the entire transverse area of the latter, indicated by area $A_2$ in FIG. 5. Since the area in $A_2$ is substantially larger than area $A_1$, a higher pressure is required to initially open the pilot piston 78 as compared to the pressure at which pilot piston 78 recloses. Accordingly, "chattering" of the valve, caused by the rapid opening and closing of the pilot piston 78 in response to transient pressure fluctuations, is minimized.

Figure 6:
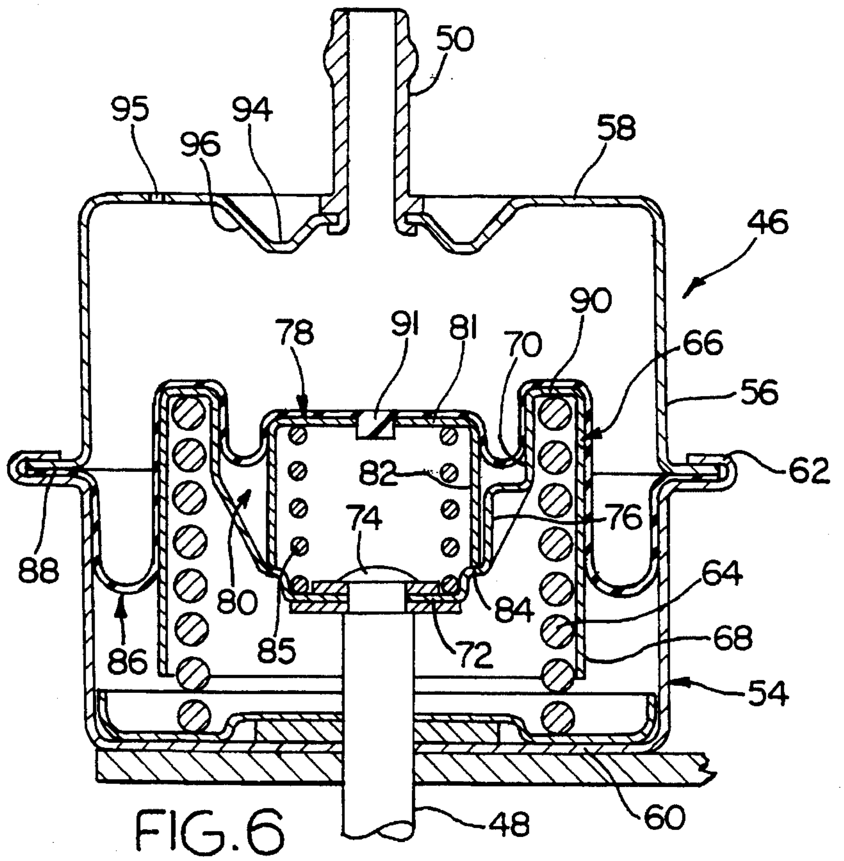

After the pilot piston 78 moves away from the valve the valve seat 94, the effective area of the actuator piston 66 becomes the entire outer diameter represented by the skirt 68. Accordingly, the force of spring 64 is overcome, thereby driving the pistons 78 and 66 downwardly, viewing FIGS. 3, 5 and 6, toward the FIG. 6 position. As the pistons move downwardly, movement of the actuator piston 66 is transmitted through the linkage 48 to the wastegate valve, opening the latter.

Figure 7:
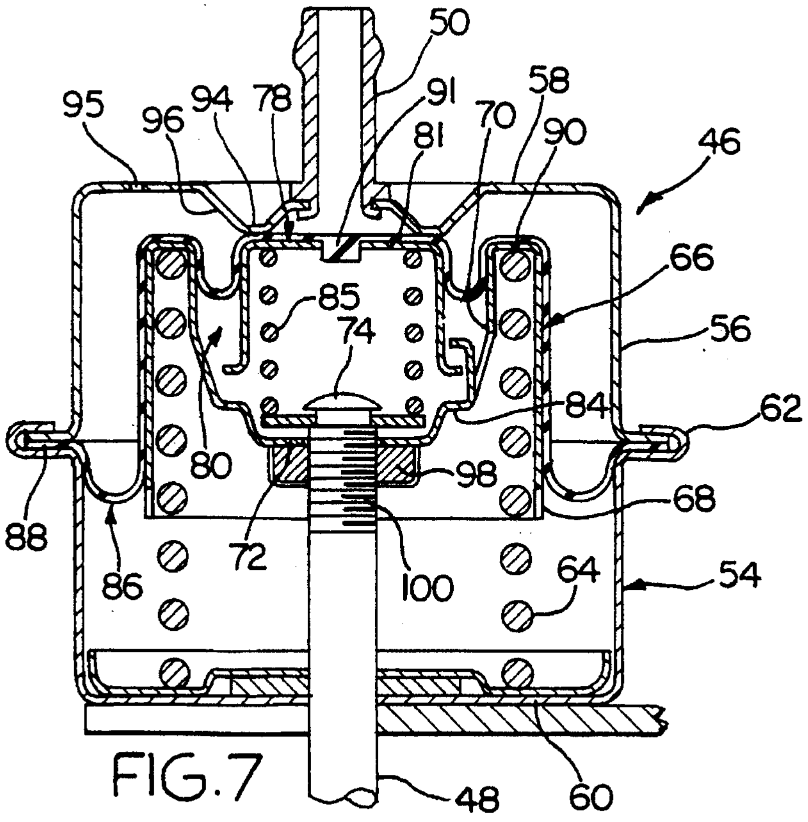
FIGS. 7 and 8 are views similar to FIG. 3 but illustrating alternative embodiments of the invention.
Figure 8:
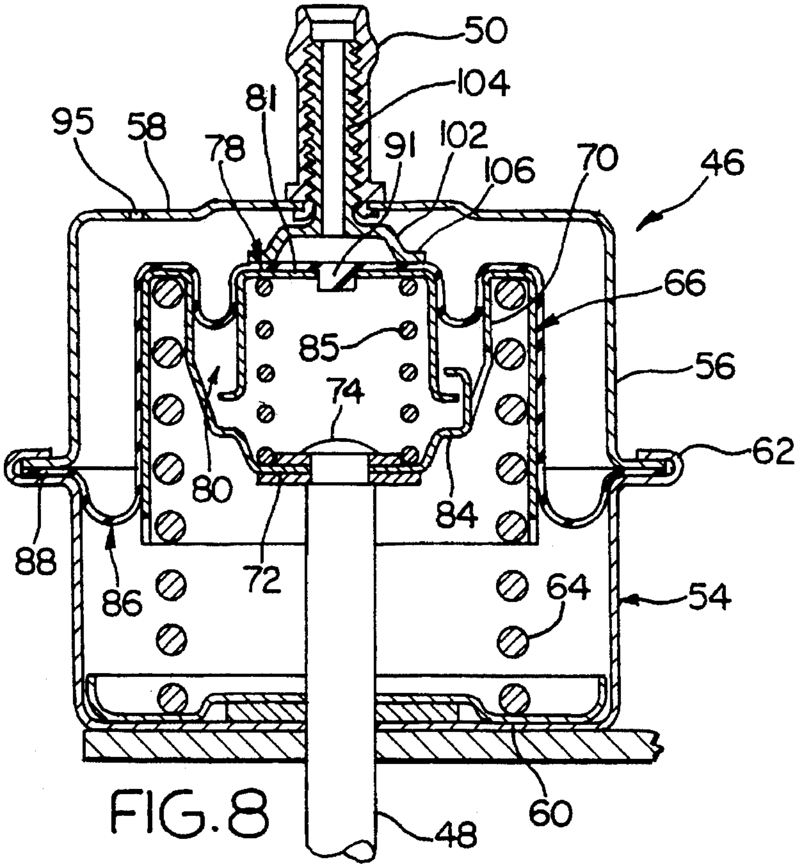

Although the undershoot R indicated in FIG. 2 may be acceptable in most applications, any overshoot represented by the curve Q in FIG. 2 may be unacceptable. Accordingly, it may be desirable in some applications to be able to adjust the force applied by the pilot spring 85, to permit the latter to be adjusted to minimize any overshoot or undershoot. Referring to FIG. 7, a threaded member 98 is secured to the transverse surface 72 of actuator piston 66. The threads of the member 98 are engaged with threads 100 on the actuating linkage 48. Accordingly, the actuating linkage may be rotated (before it is secured to the wastegate valve when the turbocharger is assembled) to thereby adjust the length of the pilot spring 85. Referring to FIG. 8, an adjusting cup member 102 is provided with threads 104 which are engaged with corresponding threads on the internal diameter of the inlet projection 50. Accordingly, a screwdriver or similar tool may be inserted through the opened end of the inlet projection to rotate the cup 102, thereby adjusting the force applied by the spring 85. In this case, the transverse surface 106 of the cup 102 becomes the valve seat corresponding to valve seat 94 in the embodiment of FIG. 3 against which the pilot piston 78 seals. Since it is important that any leakage from the housing 54 be strictly limited, the threads 104 on member 102 are preferably slightly oversized nylon threads which effect seal with the threads on inlet projection 50. Alternatively, an O-ring seal (not shown) can be mounted in a groove (not shown) on member 102 to effect a seal against projection 50.

Some turbochargers, such as the one disclosed in U.S. Pat. No. 4,643,640, are provided with a variable geometry mechanism as a part of the turbine housing 14. The variable geometry mechanism is operated by a pneumatic actuator which, in the prior art, was subject to gradually increasing boost pressure at low engine speeds. Accordingly, the variable geometry mechanism was operated prematurely. The actuator 46, can be used to actuate the variable geometry mechanism through a conventional linkage mechanism, thus avoiding premature operation of the variable geometry mechanism.

We claim:

1. Exhaust gas driven turbocharger comprising a compressor housing, a turbine housing, and a center housing supporting the turbine housing on one end thereof and the compressor housing on the other end thereof, a shaft supported for rotation within said center housing, one end of the shaft extending into said compressor housing and supporting a compressor wheel for rotation relative to the compressor housing, the other end of said shaft extending into said turbine housing and supporting a turbine wheel for rotation relative to said turbine housing, said turbine housing including means for directing engine exhaust gases through the turbine wheel to effect rotation of the shaft, said compressor housing including means for directing air through a compressor inlet and then to said compressor wheel for compression thereby to generate boost air and for directing boost air out of said compressor housing through an outlet, said turbine housing including a mechanically actuated device operable to limit the pressure of the boost air, and a pressure operated actuator responsive to the pressure level of the boost air for operating said mechanically actuated device, said actuator including a housing having an axis, a circumferentially extending wall circumscribing the axis, and an actuator inlet communicated with said boost air, an actuator piston responsive to the pressure level communicated into said housing through the actuator inlet, linkage means connecting the actuator piston with said mechanically actuated device, and a pilot piston slidably mounted within said housing for closing said actuator inlet until the pressure level of the boost air attains a predetermined level wherein each of said pistons includes a fluid pressure responsive surface, and a diaphragm having a peripheral portion secured to said circumferentially extending wall of the actuator housing and extending across the fluid pressure responsive surfaces of both pistons, and means securing the diaphragm to said pilot position.

2. Exhaust gas driven turbocharger as claimed in claim 1, further including a pilot control spring yieldably urging said pilot piston into sealing engagement with a valve seat to control communication through said actuator inlet into said housing.

3. Exhaust gas driven turbocharger as claimed in claim 2, wherein said pilot piston is coaxial with said actuator piston, said actuator piston being urged toward said actuator inlet by an actuator spring.

4. Exhaust gas driven turbocharger as claimed in claim 3, wherein said housing includes a circumferentially extending lip circumscribing said actuator inlet, said lip defining said valve seat engaged by said pilot piston to control communication through said actuator inlet.

5. Exhaust gas driven turbocharger as claimed in claim 3, wherein said housing further comprises a pair of end walls extending transversely to said axis, each of said pistons being moveable along said axis, said actuator inlet being carried by one of said end walls and coaxial with the said pistons, said linkage means extending through the other end wall.

6. Exhaust gas driven turbocharger as claimed in claim 3, wherein each of said pistons are movable along an axis, said pilot piston having an axially projecting, circumferentially extending skirt, the end of said skirt being engageable with a circumferentially extending surface of said actuator piston to limit relative axial movement of said pilot piston relative to said actuator piston.

7. Exhaust gas driven turbocharger as claimed in claim 3, wherein each of said pistons are movable along an axis, and cooperating guide means carried by said pistons for centralizing and guiding the pilot piston relative to the actuator piston.

8. Exhaust gas driven turbocharger as claimed in claim 3, wherein calibration means are provided to control the pressure level at which the pilot piston moves away from said valve seat.

9. Exhaust gas driven turbocharger as claimed in claim 8, wherein said calibration means includes an adjustable connection between the linkage means and the actuator piston.

10. Exhaust gas driven turbocharger as claimed in claim 8, wherein said calibration means includes a cup threadedly engaged with the actuator inlet and engageable with said pilot piston, said cup being adjustable relative to said housing to control the force of said pilot control spring.

11. Exhaust gas driven turbocharger as claimed in claim 1, wherein said pilot control spring is positioned between the actuator piston and said pilot piston.

12. Pressure operated actuator responsive to the pressure level of the boost air delivered by an exhaust gas driven turbocharger for operating a mechanically actuated device operable to limit the pressure of the boost air said actuator consisting of a single housing having an actuator inlet communicated with said boost air, an actuator piston responsive to the pressure level communicated into said housing throughout the actuator inlet, linkage means connecting the actuator piston with said mechanically actuated device, a pilot piston slidably mounted in said housing concentric with said actuator piston, and a single diaphragm interposed between the pistons and the actuator inlet, said pilot piston being controlled by a pilot control spring yieldably urging said pilot piston into sealing engagement with a valve seat to control communication of the boost air into said housing.

13. Exhaust gas driven turbocharger as claimed in claim 12, wherein said housing includes an actuator inlet communicating boost air into said housing and a circumferentially extending lip circumscribing said actuator inlet, said lip defining said valve seat engaged by said pilot piston to control communication through said actuator inlet.

14. Exhaust gas driven turbocharger as claimed in claim 13, wherein said housing has a circumferentially extending wall circumscribing an axis and a pair of end walls extending transversely to said axis, each of said pistons being movable along said axis, said actuator inlet being carried by one of said end walls and coaxial with said pistons, said linkage means extending through the other end wall.

15. Exhaust gas driven turbocharger as claimed in claim 14, wherein each of said pistons includes a fluid pressure responsive surface, and a diaphragm having a peripheral portion secured to said circumferentially extending wall and extending across the fluid pressure responsive surfaces of both pistons, and means securing the diaphragm to said pilot piston.

16. Exhaust gas driven turbocharger as claimed in claim 12, wherein each of said piston is moveable along an axis, and said pistons further comprise cooperating guide means carried by said pistons for centralizing and guiding the pilot piston relative to the actuator piston.

17. Exhaust gas driven turbocharger as claimed in claim 12, wherein calibration means are provided to control the pressure level at which the pilot piston moves away from said valve seat.

18. Exhaust gas driven turbocharger as claimed in claim 12, wherein said calibration means includes an adjustable connection between the linkage means and the actuator piston.

19. Exhaust gas driven turbocharger as claimed in claim 12, wherein said pilot control spring is positioned between the actuator piston and said pilot piston.

20. Pressure operated actuator responsive to the pressure level of the boost air delivered by an exhaust gas driven turbocharger for operating a mechanically actuated device operable to limit the pressure of the boost air, said actuator consisting of a single housing having an actuator inlet communicated with said boost air and terminating in a pilot piston valve seat, an actuator piston responsive to the pressure level communicated into said housing through the actuator inlet, linkage means connecting the actuator piston with said mechanically actuated device, a pilot piston slidably mounted in said housing concentric with said actuator piston, and a single diaphragm interposed between the pistons and the actuator inlet, said pilot piston being controlled by a pilot control spring yieldably urging said pilot piston into sealing engagement with a valve seat to control communication of the boost air into said housing until the pressure level of the boost air attains a predetermined level, said pilot piston when in contact with said valve seat exhibiting an effective area of A1 and said pilot piston when not in contact with said valve seat exhibiting an effective area of A2 wherein A2 is greater than A1 whereby a higher pressure is required to open the pilot valve than is required to close the pilot valve.

* * * * *